(12) United States Patent
Kamiya (10) Patent No.: US 10,737,564 B2
(45) Date of Patent: Aug. 11, 2020

(54) WEATHER STRIP

(71) Applicant: KABUSHIKI KAISHA TOYOTA JIDOSHOKKI, Aichi-ken (JP)

(72) Inventor: Tomoyasu Kamiya, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 116 days.

(21) Appl. No.: 16/072,725

(22) PCT Filed: Jan. 26, 2017

(86) PCT No.: PCT/JP2017/002734
§ 371 (c)(1),
(2) Date: Jul. 25, 2018

(87) PCT Pub. No.: WO2017/131088
PCT Pub. Date: Aug. 3, 2017

(65) Prior Publication Data
US 2019/0031007 A1    Jan. 31, 2019

(30) Foreign Application Priority Data
Jan. 27, 2016    (JP) .................... 2016-013195

(51) Int. Cl.
*B60J 10/84*    (2016.01)
*B60J 10/21*    (2016.01)
(Continued)

(52) U.S. Cl.
CPC ............... *B60J 10/84* (2016.02); *B60J 10/21* (2016.02); *B60J 10/24* (2016.02); *B60J 10/26* (2016.02)

(58) Field of Classification Search
None
See application file for complete search history.

(56) References Cited

U.S. PATENT DOCUMENTS 3,706,173 A  * 12/1972 Taylor ..................... B60J 10/26
52/717.03
4,311,747 A  * 1/1982 Kruschwitz ............. B60J 10/35
428/122

(Continued)

FOREIGN PATENT DOCUMENTS

| DE | 9308418.8 | 9/1993 |
|---|---|---|
| GB | 2 161 525 | 1/1986 |

(Continued)

OTHER PUBLICATIONS

International Search Report in International Patent Application No. PCT/JP2017/002734, dated Feb. 21, 2017.

*Primary Examiner* — Marcus Menezes
(74) *Attorney, Agent, or Firm* — Greenblum & Bernstein, P.L.C.

(57) ABSTRACT

A weather strip includes a welt portion, which is configured to be attached to a peripheral edge of an opening of a main body member, a sealing portion connected to the welt portion. The sealing portion includes a contact surface, which is configured to contact an opening-closing member that opens or closes the opening, and is configured to seal the boundary between the main body member and the opening-closing member. The sealing portion has a hollow or enclosed gel. A transverse groove is provided on the outer peripheral surface except for the contact surface. The transverse groove extends along a direction from the welt toward the sealing portion.

8 Claims, 9 Drawing Sheets

(51) Int. Cl.
  *B60J 10/24* (2016.01)
  *B60J 10/26* (2016.01)

(56) References Cited

U.S. PATENT DOCUMENTS

| | | | | |
|---|---|---|---|---|
| 4,447,065 A * | 5/1984 | Dupuy | ................ | B60J 10/24 277/642 |
| 5,035,937 A * | 7/1991 | Nozaki | ................ | E06B 7/2309 428/122 |
| 5,181,341 A | 1/1993 | Keys et al. | | |
| 6,571,514 B1 * | 6/2003 | Aritake | ............ | B29C 45/14409 49/490.1 |
| 6,623,832 B2 * | 9/2003 | Greven | ................ | B60J 10/248 277/641 |
| 7,293,820 B2 * | 11/2007 | Hashimoto | .............. | B60J 10/24 296/146.9 |
| 7,306,839 B2 * | 12/2007 | Kubo | ................ | B29C 45/14409 428/122 |
| 2005/0064135 A1 * | 3/2005 | Perrin | ...................... | B60J 10/24 428/122 |
| 2005/0235572 A1 * | 10/2005 | Kamei | ..................... | B60J 10/18 49/490.1 |
| 2008/0295414 A1 * | 12/2008 | Miyakawa | ............... | B60J 10/24 49/490.1 |
| 2016/0159210 A1 * | 6/2016 | Van Der Stap | .......... | B60J 10/21 49/475.1 |
| 2019/0061208 A1 * | 2/2019 | Bocking | .................... | B60J 1/00 |

FOREIGN PATENT DOCUMENTS

| | | | | |
|---|---|---|---|---|
| JP | 6-57779 | | 8/1994 | |
| JP | 7-77279 | | 3/1995 | |
| JP | 2000-6839 | | 1/2000 | |
| JP | 2002274187 A | * | 9/2002 | ............. B60J 10/21 |
| WO | WO-9835847 A1 | * | 8/1998 | ............ B60J 10/235 |

* cited by examiner

WEATHER STRIP

TECHNICAL FIELD

The present invention relates to a weather strip that has a welt portion, which is configured to be attached to a peripheral portion surrounding an opening of a main body member, and a sealing portion, which is configured to be connected to the welt portion and contact an opening-closing member that opens or closes the opening, thereby sealing the boundary between the main body member and the opening-closing member.

BACKGROUND ART

For example, Patent Document 1 discloses a weather strip. The weather strip is attached to the periphery surrounding the opening of the back door of a vehicle body as a main body member. The weather strip serves as a sealing member that seals the boundary between the vehicle body and the back door as an opening-closing member. The weather strip is made of rubber and elastic. The weather strip has a welt portion, which holds the peripheral edge of the vehicle body opening, and a hollow sealing portion, which is connected to the welt portion. When the opening is closed by the back door, the back door contacts the weather strip, and the weather strip is elastically deformed and crushed due to the pressing of the back door. At this time, the weather strip is in intimate contact with the outer peripheral portion of the back door at the contact surface of the weather strip, and the vehicle body and the back door have satisfactory sealing property over the entire peripheral edge of the vehicle body.

PRIOR ART DOCUMENT

Patent Document

Patent Document 1: Japanese Laid-Open Patent Publication No. 2000-6839

SUMMARY OF THE INVENTION

Problems that the Invention is to Solve

The weather strip of Patent Document 1 is elastic. The weather strip is one of the elements that control the vibration characteristics of the back door. Since the weather strip is allowed to function as a spring, the noise in the passenger compartment is reduced. Therefore, a weather strip is attached to the peripheral edge surrounding the opening provided in the back of the vehicle body. However, portions of the weather strip that are attached to curved portions of the peripheral edge are crushed and compressed or pulled and extended in the longitudinal direction of the weather strip in some cases. In such cases, the curved portions of the weather strip may become hard and fail to function as a spring. In addition, the curved portions of the weather strip may not conform to the curved shapes of the peripheral edge and float away from the peripheral edge. Thus, particularly in the curved portions of the peripheral edge, the weather strip is more likely to fail to function as a spring than in the straight portions.

Accordingly, it is an objective of the present invention to provide a weather strip that is allowed to be attached along the peripheral edge of a main body member and to be elastic while having a satisfactory sealing property between the main body member and an opening-closing member when the opening-closing member closes an opening of the main body member.

Means for Solving the Problems

To achieve the foregoing objective and in accordance with one aspect of the present invention, a weather strip that includes a welt portion and a sealing portion is provided. The welt portion is configured to be attached to a peripheral edge of an opening of a main body member. The sealing portion is connected to the welt portion. The sealing portion includes a contact surface, which is configured to contact an opening-closing member that opens or closes the opening. The sealing portion is configured to seal a boundary between the main body member and the opening-closing member. The sealing portion has a hollow or enclosed gel. A transverse groove is provided on an outer peripheral surface except for the contact surface, the transverse groove extending along a direction from the welt toward the sealing portion.

MODES FOR CARRYING OUT THE INVENTION

A weather strip according to one embodiment of the present invention will now be described with reference to the drawings. The present embodiment illustrates, by way of example, a weather strip as a sealing member attached to a vehicle body as a main body member. Specifically, the weather strip is attached to the peripheral edge surrounding the opening for the back door provided at the back of the vehicle body and seals the boundary between the back door as an opening-closing member and the peripheral edge.

Figure 1:
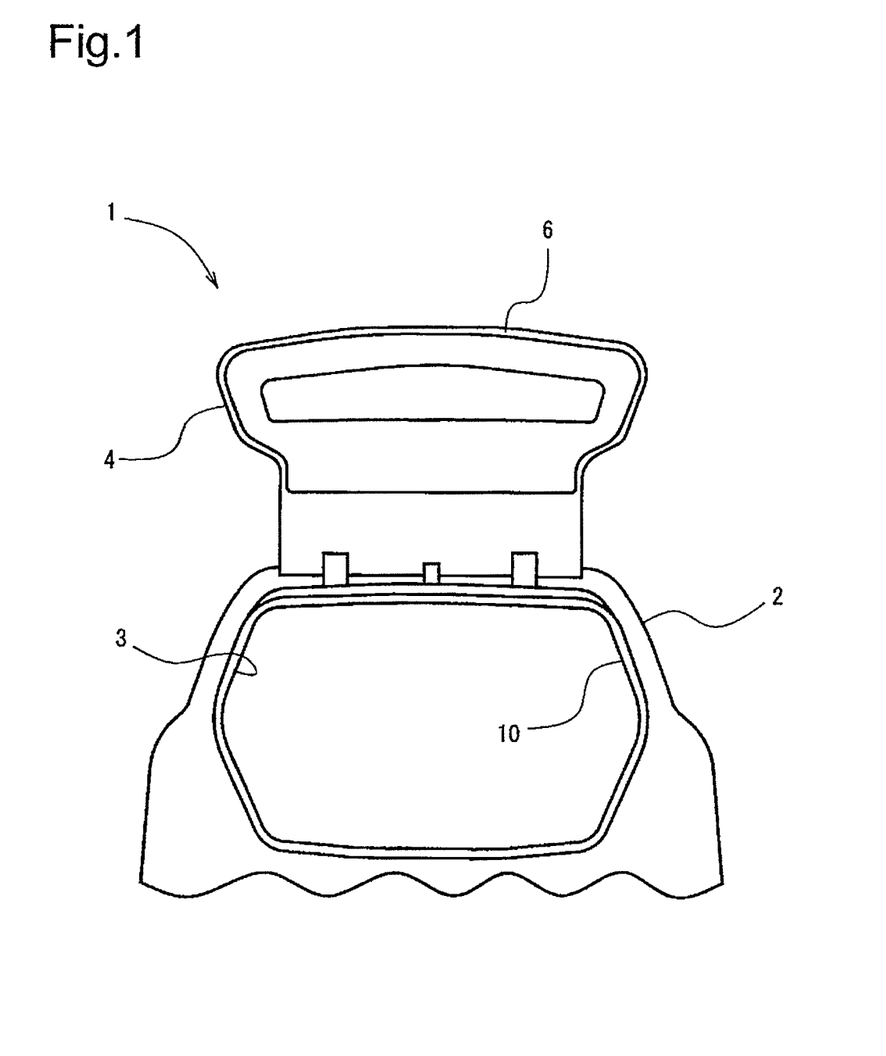
FIG. 1 is a schematic rear view showing a vehicle to which a weather strip according to one embodiment of the present invention is attached.
Figure 2:
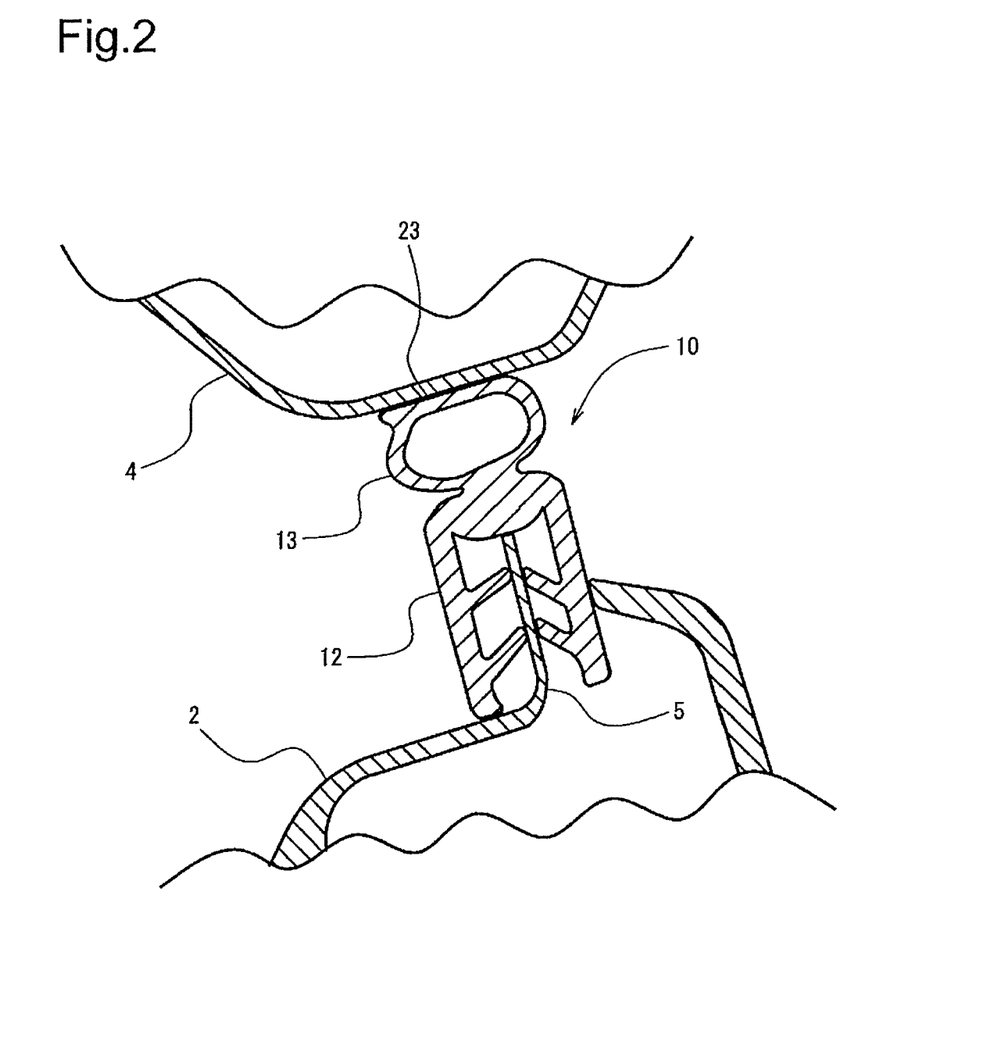
FIG. 2 is a cross-sectional view showing a state in which the weather strip according to the embodiment of the present invention is attached to the vehicle body and the back door is closed.

As shown in FIGS. 1 and 2, a vehicle 1 includes a vehicle body 2. The vehicle body 2 has an opening 3, which is an opening used to load baggage from the outside into the vehicle and unload baggage from the inside of the vehicle to the outside. The opening 3 opens toward the rear of the vehicle 1. The vehicle 1 has a back door 4 as a door capable of opening and closing the opening 3.

The back door 4 has a size capable of closing the entire opening 3. The back door 4 is attached to the upper rear part of the vehicle body 2. One horizontally extending side of the back door 4 is connected to the upper rear part of the vehicle body 2. The back door 4 has an outer peripheral portion 6 over the entire periphery of the surface facing the opening 3. The back door 4 is pivotal about the side connected to the upper rear part of the vehicle body 2. Specifically, from the closing state in which the back door 4 closes the opening 3, the back door 4 can be pulled upward from the rear while being pivoted about the upper rear part of the vehicle body 2 to the open state in which the back door 4 opens the opening 3. Likewise, from the open state, the back door 4 is pulled downward from above while being pivoted about the upper rear part of the vehicle body 2 to the closed state.

The vehicle body 2 has a loop of peripheral edge 5 extending upright from the opening 3. A loop of a weather strip 10 is attached to the peripheral edge 5. The weather strip 10 is a sealing member, which is located between the back door 4 and the peripheral edge 5 when the back door 4 is closed and seals the boundary between the back door 4 and the peripheral edge 5. The weather strip 10 is an extruded rubber member and elastic. The weather strip 10 includes a welt portion 12, which is configured to hold the peripheral edge 5 of the opening 3 of the vehicle body 2, and a sealing portion 13, which is configured to contact the outer peripheral portion 6 of the back door 4.

Figure 3:
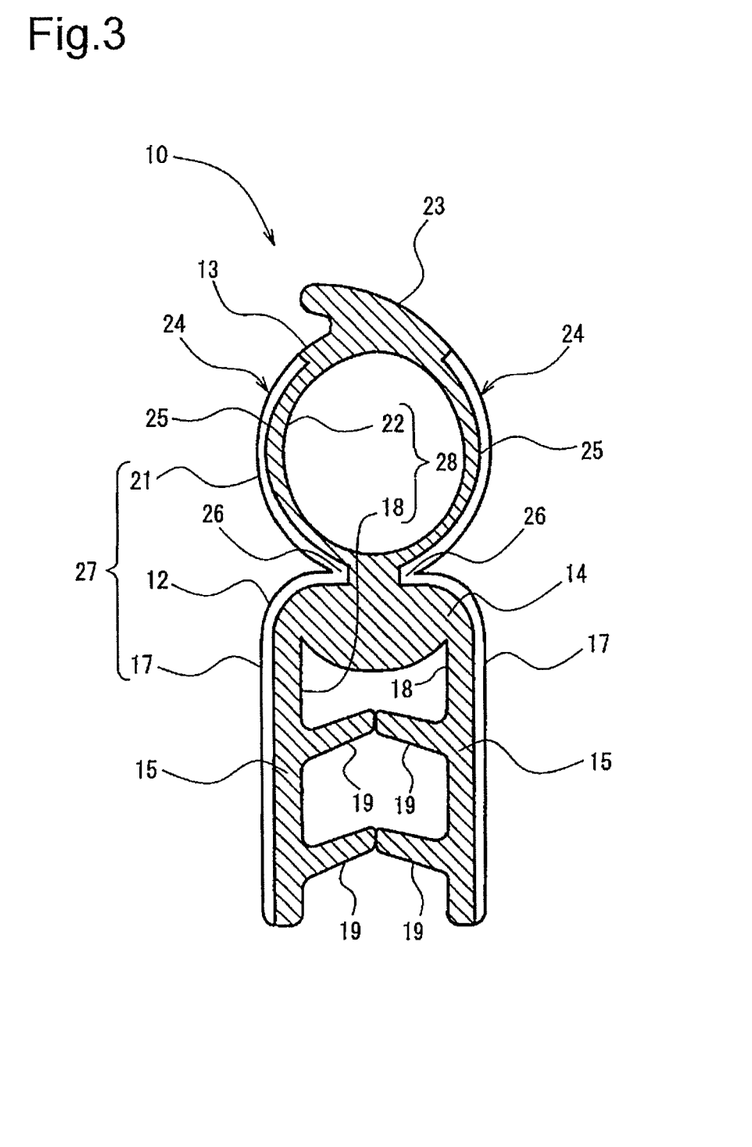
FIG. 3 is a cross-sectional view showing the weather strip according to the embodiment of the present invention.
Figure 4:
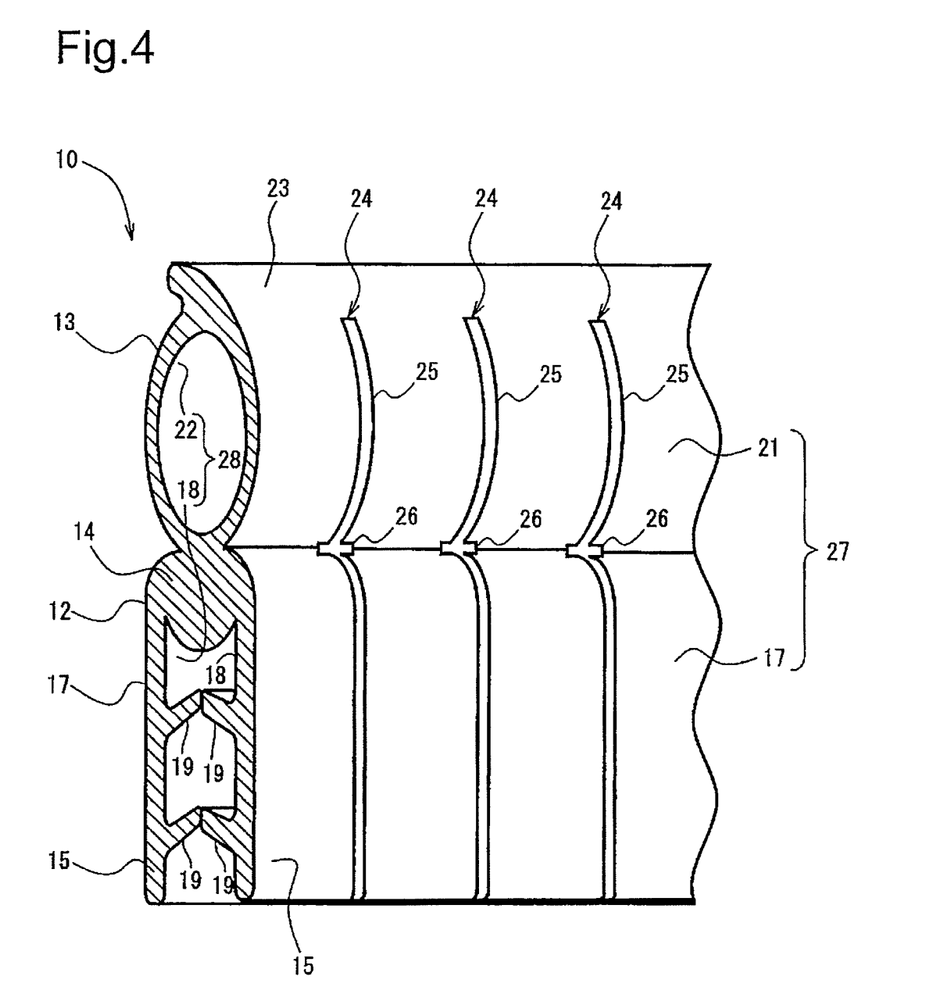
FIG. 4 is a perspective view showing the weather strip according to the embodiment of the present invention.

As shown in FIGS. 3 and 4, the welt portion 12 has two side portions 15 provided on the opposite sides of a top portion 14 connected to the sealing portion 13. Each side portion 15 has an outer peripheral surface 17 and an inner peripheral surface 18. The top portion 14, the side portion 15, the outer peripheral surface 17, and the inner peripheral surface 18 extend in the longitudinal direction of the weather strip 10. The welt portion 12 has protrusions 19, which protrude from the inner peripheral surfaces 18 and are integrated with the welt portion 12. The protrusions 19 extend in the longitudinal direction of the weather strip 10. The protrusions 19 are sections that hold the peripheral edge 5 of the opening 3 of the vehicle body 2 such that the weather strip 10 is supported by the vehicle body 2 while being attached to the peripheral edge 5.

The sealing portion 13 is integrated with and connected to the welt portion 12. The sealing portion 13 is hollow and is annular in cross section. The sealing portion 13 comprises an outer peripheral surface 21 and an inner peripheral surface 22. The outer peripheral surface 21 and the inner peripheral surface 22 extend in the longitudinal direction of the weather strip 10. The outer peripheral surface 21 has a contact surface 23, which is configured to contact the outer peripheral portion 6 of the back door 4 shown in FIG. 1 when the back door 4 is closed. The contact surface 23 is located on the opposite side to the boundary with the welt portion 12 in the annular cross section of the sealing portion 13. The outer peripheral surface 21 and the outer peripheral surface 17 constitute an outer peripheral surface 27 of the weather strip 10. The inner peripheral surface 22 and the inner peripheral surface 18 constitute an inner peripheral surface 28 of the weather strip 10.

Figure 5:
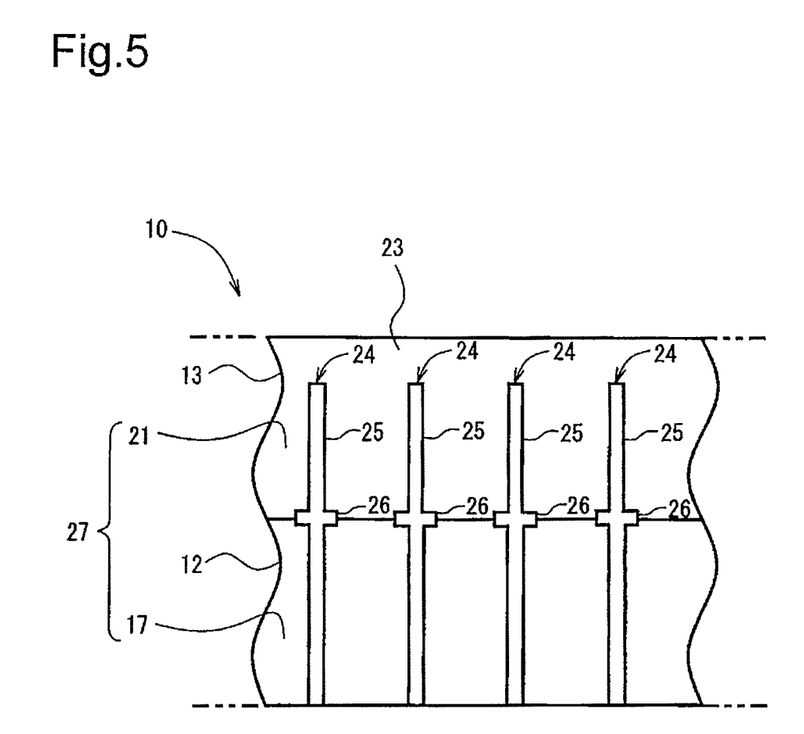
FIG. 5 is a side view showing grooves provided along the longitudinal direction of the weather strip according to the embodiment of the present invention.

As shown in FIGS. 3 to 5, the weather strip 10 has grooves 24 on the outer peripheral surface 27. The outer peripheral surface 27 has pairs of grooves 24 on the outer peripheral surface 27. As shown in FIG. 3, the grooves 24 of each pair are located on the opposite sides of the contact surface 23 in the cross section of the weather strip 10. As shown in FIGS. 4 and 5, the grooves 24 are arranged along the longitudinal direction of the outer peripheral surface 27.

The grooves 24 include transverse grooves 25 and lateral grooves 26. The transverse grooves 25 extend along the direction from the sealing portion 13 to the welt portion 12 on the outer peripheral surface 27 of the weather strip 10 excluding the contact surface 23. The lateral grooves 26 extend along the boundary between the sealing portion 13 and the welt portion 12 and are connected to the transverse grooves 25.

The transverse grooves 25 extend on the outer peripheral surface 27 of the weather strip 10 so as to be orthogonal to the longitudinal direction of the outer peripheral surface 27. The transverse grooves 25 extend continuously from the sealing portion 13 to the welt portion 12. Specifically, the transverse grooves 25 extend partly in the width in the sealing portion 13, but extend in the entire width in the welt portion 12. The lateral grooves 26 extend so as to be orthogonal to the transverse grooves 25. The transverse grooves 25 and the lateral grooves 26 are grooves having a rectangular cross section with a depth in the thickness direction of the weather strip 10 from the outer peripheral surface 27 of the weather strip 10. The transverse grooves 25 and the lateral grooves 26, which are provided on the outer peripheral surface 27 of the weather strip 10, do not extend to the inner peripheral surface 28 of the weather strip 10.

An operation of the weather strip 10 of the present embodiment will now be described.

The weather strip 10 functions as one of the elements that control the vibration characteristics of the back door 4 and is attached to the entire peripheral edge 5 of the opening 3 of the vehicle body 2. A portion of the weather strip 10 that is attached to a curved portion of the peripheral edge 5 is elastically deformed to conform to the curved shape due to the grooves 24 provided on the weather strip 10 and the elasticity of the weather strip 10.

Figure 6A:
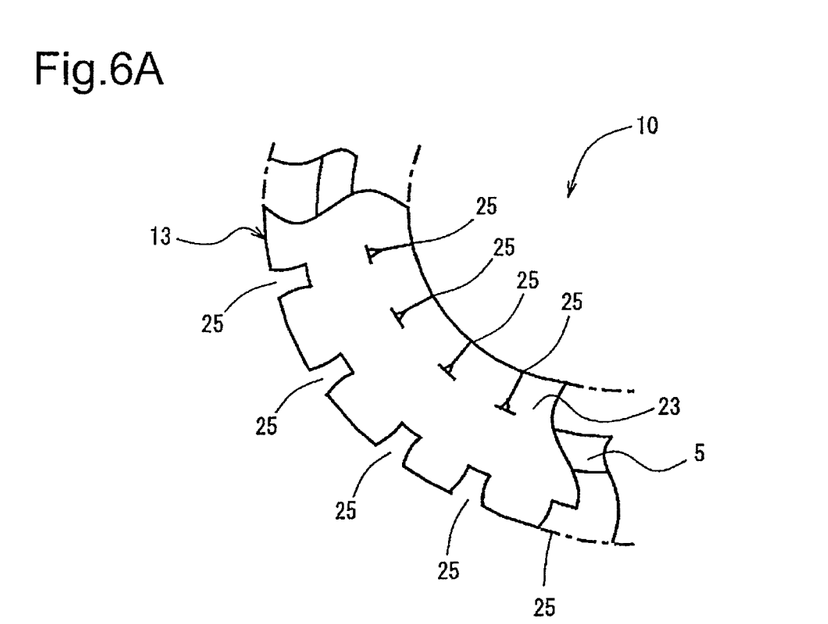
FIG. 6A is a top view of the weather strip according to the embodiment of the present invention, illustrating a state in which the weather strip is attached to a portion of a peripheral edge that is recessed inward in the vehicle body.
Figure 6B:
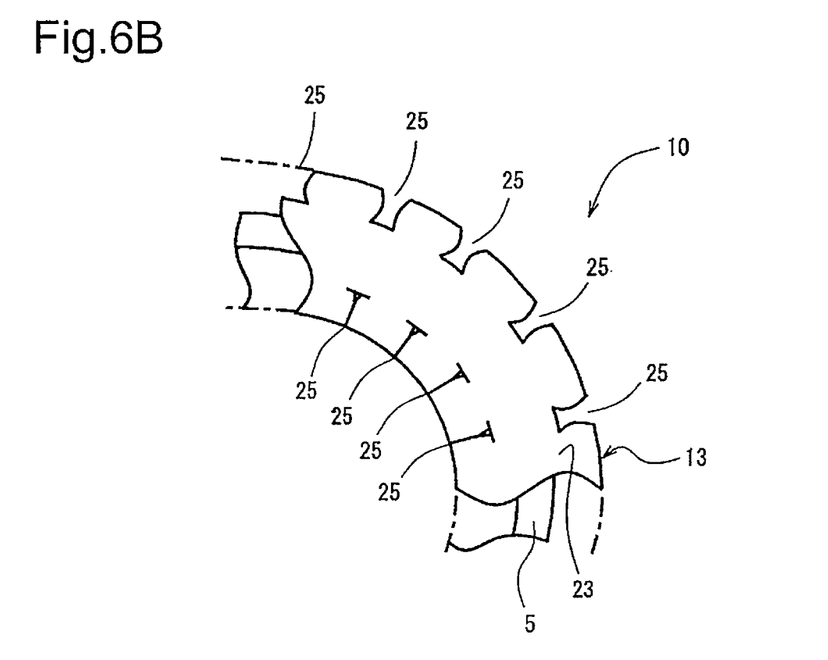
FIG. 6B is a top view illustrating a state in which the weather strip is attached to a portion of the peripheral edge that bulges inward in the vehicle body.
Figure 7A:
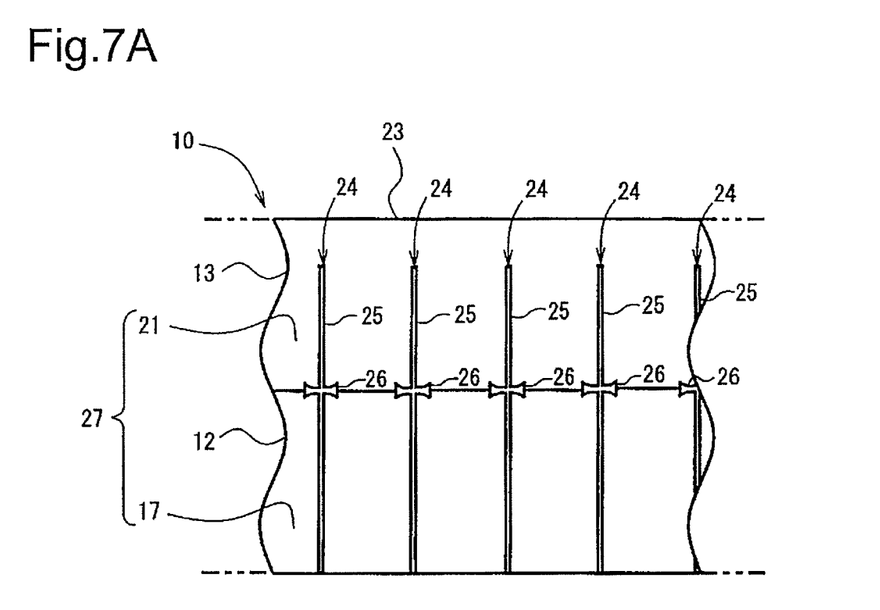
FIG. 7A is a side view of the weather strip according to the embodiment of the present invention, illustrating a state in which the weather strip is curved inward so that the grooves are closed.
Figure 7B:
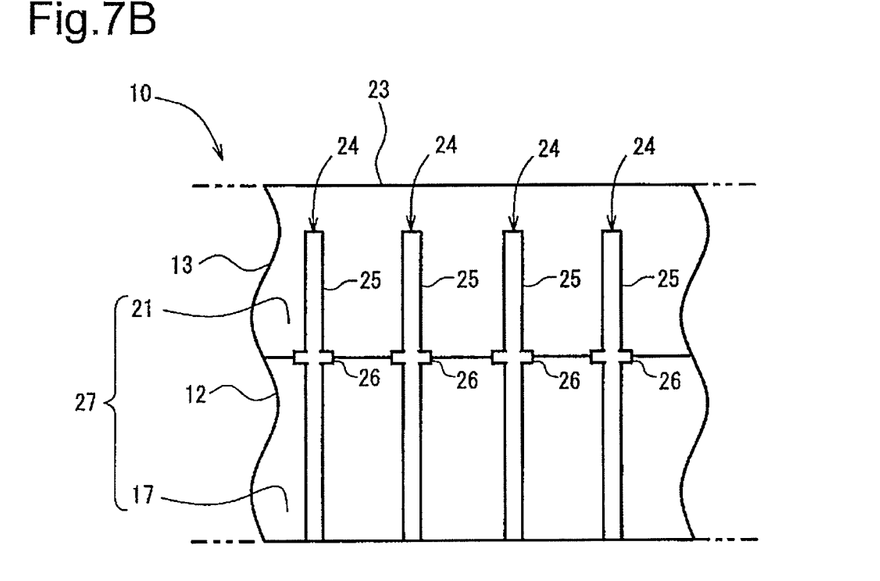
FIG. 7B is a side view illustrating a state in which the weather strip is curved outward so that the grooves are open.

As shown in FIGS. 6A and 7A, in a portion of the peripheral edge 5 where the inner side is recessed, the transverse grooves 25 on the inner side of the weather strip 10, that is, the transverse grooves 25 on the radially inner side are collapsed and closed, and the transverse grooves 25 on the radially outer side are opened to widen toward the outer ends. As shown in FIGS. 6B and 7B, in a portion of the peripheral edge 5 where the inner side bulges, the transverse grooves 25 on the inner side of the weather strip 10 are opened to widen toward the inner ends, and the transverse grooves 25 on the outer side are collapsed and closed.

When the weather strip 10 is attached to the peripheral edge 5 of the opening 3 of the vehicle body 2 and the opening 3 of the vehicle body 2 is closed by the back door 4, the outer peripheral portion 6 of the back door 4 contacts the contact surface 23 of the weather strip 10. The pressing by the back door 4 elastically deforms the sealing portion 13 of the weather strip 10 as shown in FIG. 2.

The elasticity of the weather strip 10 brings the outer peripheral portion 6 of the back door 4 and the contact surface 23 of the weather strip 10 into intimate contact. The weather strip 10, which is elastically deformed by the grooves 24, maintains a satisfactory elasticity in a state in which the outer peripheral portion 6 of the back door 4 and the peripheral edge 5 of the opening 3 of the vehicle body 2 have a satisfactory sealing property over the entire periphery.

The present embodiment has the following operational advantages.

(1) The elastic weather strip 10 has the grooves 24, which are arranged along the longitudinal direction of the outer peripheral surface 27. The grooves 24 include the transverse grooves 25, which extend on the outer peripheral surface 27 along the direction from the sealing portion 13 toward the welt portion 12, and the lateral grooves 26, which intersect with the transverse grooves 25. Thus, a portion of the weather strip 10 that is attached to a curved portion of the peripheral edge 5 of the opening 3 of the vehicle body 2 is elastically deformed along the curved shape of the peripheral edge 5 due to the grooves 24.

The weather strip 10 is elastically deformed such that the transverse grooves 25 are closed in a portion of the outer peripheral surface 27 that is curved inward and that the transverse grooves 25 are opened in a portion of the outer peripheral surface 27 that is curved outward. Thus, a portion of the weather strip 10 that is attached to a curved portion of the peripheral edge 5 is prevented from being contracted in the longitudinal direction and hardened thus failing to function as a spring and from floating from the peripheral edge 5. Thus, the weather strip 10 is allowed to be attached to the peripheral edge 5 of the opening 3 of the vehicle body 2. Therefore, the weather strip 10 has elasticity that functions as a spring in a state in which it is attached to the peripheral edge 5 so as to have a sealing property between the vehicle body 2 and the back door 4, and reduces the generation of noise in the passenger compartment.

(2) The transverse grooves 25 of the grooves 24 provided on the outer peripheral surface 27 of the weather strip 10 extend in a direction orthogonal to the longitudinal direction of the outer peripheral surface 27. Therefore, a portion of the weather strip 10 attached to a curved portion of the peripheral edge 5 of the opening 3 of the vehicle body 2 is easily elastically deformed in the longitudinal direction of the outer peripheral surface 27 due to the transverse grooves 25, which extend in a direction orthogonal to the longitudinal direction of the outer peripheral surface 27, and the portion has a satisfactory elasticity.

(3) The grooves 24 provided on the outer peripheral surface 27 of the weather strip 10 have lateral grooves 26, which intersect orthogonally with the transverse grooves 25. The lateral grooves 26 are collapsed and closed in a direction orthogonal to the longitudinal direction of the outer peripheral surface 27 by the pressing of the back door 4 when the opening 3 of the vehicle body 2 is closed by the back door 4. Thus, even if the back door 4 presses the contact surface 23 of the weather strip 10, the weather strip 10 is prevented from being compressed in the pressing direction and hardened and failing to function as a spring. Therefore, the weather strip 10 has elasticity that functions as a spring in a state in which it is attached to the peripheral edge 5 so as to have a sealing property between the vehicle body 2 and the back door 4, and reduces the generation of noise in the passenger compartment.

(4) The lateral grooves 26 of the grooves 24 provided on the outer peripheral surface 27 of the weather strip 10 are provided along the boundary between the sealing portion 13 and the welt portion 12. Therefore, the lateral grooves 26 are crushed to absorb the load that is concentrated on the boundary between the sealing portion 13 and the welt portion 12 when the opening 3 is closed by the back door 4 and the back door 4 presses and crushes the sealing portion 13.

The present invention is not to be limited to the foregoing embodiment, but may be modified as follows within the scope of the invention.

In the above-described embodiment, the weather strip 10 includes the welt portion 12 and the hollow sealing portion 13 having an annular cross section. The welt portion 12 has the top portion 14, which connects the side portions 15, having the protrusions 19 protruding from the inner peripheral surface 18. The sealing portion 13 is integrated with and connected to the welt portion 12. Alternatively, the welt portion 12 may be changed to any shape as long as it can hold the peripheral edge 5 of the opening 3 of the vehicle body 2. Further, the sealing portion 13 may be changed to any shape as long as it has a satisfactory elasticity.

Figure 8A:
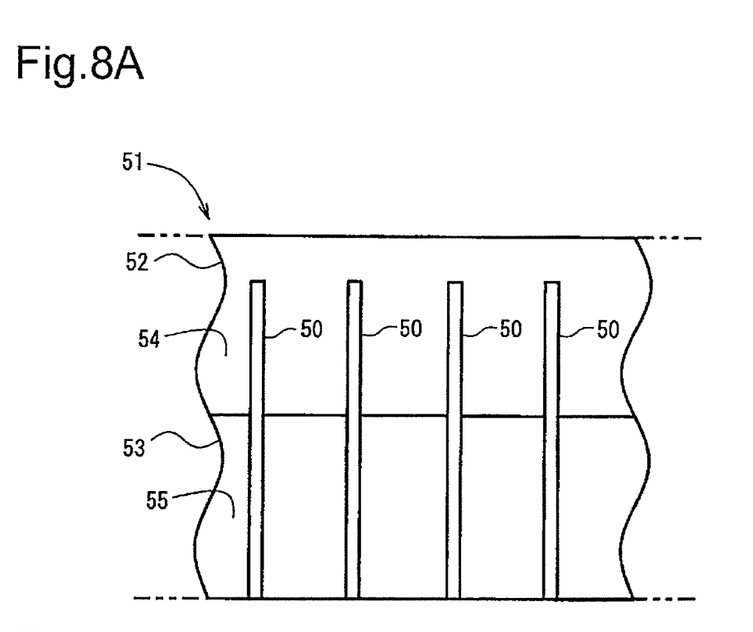
FIG. 8A is a side view showing a weather strip according to a first modification, which has no lateral grooves.
Figure 8B:
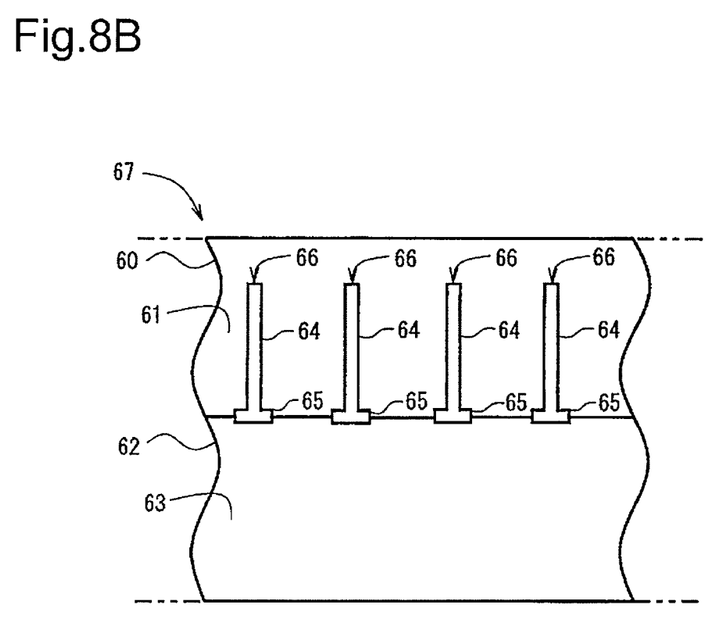
FIG. 8B is a side view showing a weather strip according to a second modification, which has transverse grooves only on the outer peripheral surface of the sealing portion.

In the above-described embodiment, the grooves 24 are provided, which include the transverse grooves 25 and the lateral grooves 26 shown in FIG. 5 on the outer peripheral surface 27 of the weather strip 10, but the configuration is not limited to this. As long as the elastic deformation capability of the weather strip 10 can be improved, the configuration of the grooves 24 may be changed as necessary. FIG. 8A illustrates a first modification, in which a weather strip 51 is provided with grooves 50 including only transverse grooves. The transverse grooves may extend from the outer peripheral surface 54 of the sealing portion 52 to the outer peripheral surface 55 of the welt portion 53 or may be provided only on the outer peripheral surface 54 of the sealing portion 52. FIG. 8B illustrates a weather strip 67 according to a second modification, in which transverse grooves 64 are not provided in a welt portion outer peripheral surface 63 of a welt portion 62, but are provided in a sealing portion outer peripheral surface 61 of a sealing portion 60. The transverse grooves 64 and lateral grooves 65 constitute grooves 66.

The above-described embodiment includes the grooves 24, which include the transverse grooves 25 and the lateral grooves 26 shown in FIG. 5 on the outer peripheral surface 27 on the opposite sides of the contact surface 23 of the weather strip 10, but the configuration is not limited to this. The grooves 24 may be provided on the outer peripheral surface 27 on one side of the weather strip 10 if it is possible to improve the elastic deformation capability of the weather strip.

In the above-described embodiment, pairs of the grooves 24 shown in FIG. 3 are provided, which are provided on the outer peripheral surface 27 on the opposite sides of the contact surface 23 of the weather strip 10, but the configuration is not limited to this. As long as the elastic deformation capability of the weather strip 10 is improved, it is not necessary to form the grooves 24 as shown in FIG. 3 so as to form pairs that are each located in the same cross section and on the opposite sides of the contact surface 23. That is, the grooves 24 do not necessarily need to be provided symmetrically on the outer peripheral surface 27 on the opposite sides in the cross-sectional view of FIG. 3, and the grooves 24 may be formed only on one side of the outer peripheral surface 27.

In the above-described embodiment, the lateral grooves 26 are formed along the boundary between the sealing portion 13 and the welt portion 12, but the configuration is not limited to this. The lateral grooves 26 may be changed to have any configuration as long as the lateral grooves 26 are crushed to absorb the load that is concentrated on the boundary between the sealing portion 13 and the welt portion 12 when the opening 3 is closed by the back door 4 and the back door 4 presses and crushes the sealing portion 13. The lateral grooves 26 may be formed by being connected to the transverse grooves 25 on either side of the outer peripheral surface 27 of the weather strip 10.

In the above-described embodiment, the lateral grooves 26 and the transverse grooves 25 have a rectangular cross section, but the configuration is not limited to this. As long as the elastic deformation capability of the weather strip 10 is improved, the lateral grooves 26 and the transverse grooves 25 may have any cross-sectional shape, for example, polygonal or elliptical cross-sectional shapes.

Figure 9:
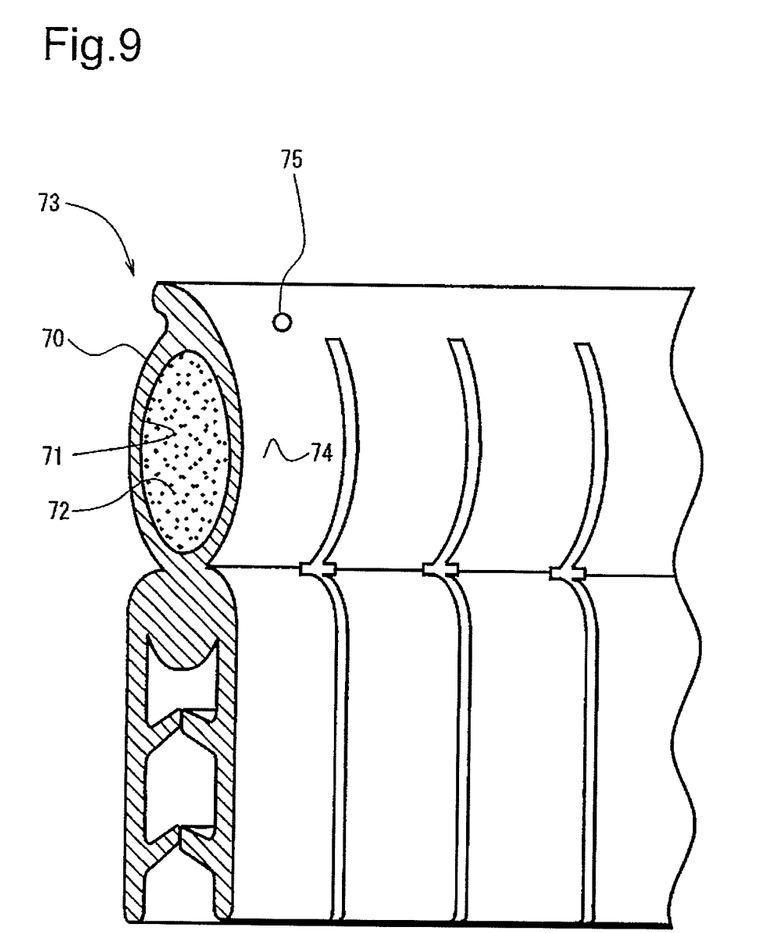
FIG. 9 is a perspective view showing a weather strip according to a third modification, which has a gel-like filling in the hollow of the sealing portion.

In the above-described embodiment, the sealing portion 13 is hollow, but the configuration is not limited to this. It is sufficient that the sealing portion 13 has elasticity and is easily crushed when the back door 4 is closed. FIG. 9 illustrates a weather strip 73 of a third modification. The weather strip 73 has a configuration in which a gel-like filling 72 is enclosed in a hollow portion 71 inside a sealing portion 70. In a portion of the weather strip 73 that is attached to a largely curved portion of the peripheral edge 5 of the opening 3 of the vehicle body 2, the filling 72 flows, preventing the contact surface in contact with the back door from spreading locally. This ensures a satisfactory sealing property of the weather strip 73.

In this case, a through-hole 75 may be pierced in the outer peripheral surface 74 of the sealing portion 70, and liquid resin may be injected from outside through the through-hole to fill the hollow portion 71. The filling 72 is formed by gelling the liquid resin. In addition, the filling 72 may be urethane instead of gel-like resin. In this case, a columnar member made of urethane may be inserted into the hollow portion 71 of the sealing portion 70 as the filling 72, and the through-hole 75 may be filled with adhesive to fix the filling 72 and the sealing portion 70.

In the above-described embodiment, the weather strip 10 has the sealing portion 13 on the top portion 14 of the welt portion 12, but the configuration is not limited to this. It is sufficient if the welt portion 12 is attached to the peripheral edge 5 of the opening 3 of the vehicle body 2 and the sealing portion 13 is crushed and is brought into sealing contact with the back door 4. For example, the sealing portion 13 may be connected to the outer peripheral surface 17 of the welt portion 12 of the side portion 15 on one side of the welt portion 12. In this case, the contact surface 23 of the sealing portion 13, which contacts the outer peripheral portion 6 of the back door 4, is located on the opposite side to the boundary with the sealing portion 13.

What is claimed is:

1. A weather strip comprising:
a welt portion, which is configured to be attached to a peripheral edge of an opening of a main body; and
a seal portion connected to the welt portion, wherein
the seal portion includes a contact surface, which is configured to contact an opening-closing structure that opens or closes the opening,
the seal portion is configured to seal a boundary between the main body and the opening-closing structure,
the seal portion has a hollow or enclosed gel,
a transverse groove is provided on an outer peripheral surface of the weather strip except for the contact surface, the transverse groove extending along a direction from the welt portion toward the seal portion, and
a plurality of lateral grooves is provided in the outer peripheral surface, and when the opening is closed by the opening-closing structure, the lateral grooves collapse to absorb a load on the weather strip from the opening-closing structure pressing the seal portion.

2. The weather strip according to claim 1, wherein the transverse groove extends in a direction orthogonal to a longitudinal direction of the outer peripheral surface.

3. The weather strip according to claim 1, wherein one of the lateral grooves, intersects with the transverse groove.

4. The weather strip according to claim 3, wherein the lateral grooves are provided at a boundary between the seal portion and the welt portion in the outer peripheral surface.

5. The weather strip according to claim 1, wherein the lateral grooves collapse to absorb the load on the weather strip that is concentrated on a boundary between the seal portion and the welt portion.

6. The weather strip according to claim 1, wherein the lateral grooves collapse in a direction orthogonal to a longitudinal direction of the outer peripheral surface to absorb the load on the weather strip.

7. A weather strip comprising:
a welt portion, which is configured to be attached to a peripheral edge of an opening of a main body; and
a seal portion connected to the welt portion, wherein
the seal portion includes a contact surface, which is configured to contact an opening-closing structure that opens or closes the opening,
the seal portion is configured to seal a boundary between the main body and the opening-closing structure,
the seal portion has a hollow or enclosed gel,
a transverse groove is provided on an outer peripheral surface of the weather strip except for the contact surface, the transverse groove extending along a direction from the welt portion toward the seal portion,
the outer peripheral surface is provided with a plurality of lateral grooves, wherein one of the lateral grooves intersects with the transverse groove,
the lateral grooves are provided at a boundary between the seal portion and the welt portion in the outer peripheral surface, the lateral grooves extend along the boundary between the seal portion and the welt portion, and the lateral grooves collapse to absorb a load on the weather strip from the opening-closing structure pressing the seal portion.

8. The weather strip according to claim 7, wherein each of the lateral grooves has a rectangular shape in which a long edge side extends along the boundary.

* * * * *